US012657990B2

(12) United States Patent
Bergant et al.

(10) Patent No.: US 12,657,990 B2
(45) Date of Patent: Jun. 16, 2026

(54) METHOD FOR REVEALING DICE RESULTS

(71) Applicant: Interblock d.o.o., Las Vegas, NV (US)

(72) Inventors: Urban Bergant, Kamnik (SI); Tomaz Fink, Visoko (SI)

(73) Assignee: INTERBLOCK D.O.O., Las Vegas, NV (US)

( * ) Notice: Subject to any disclaimer, the term of this patent is extended or adjusted under 35 U.S.C. 154(b) by 222 days.

(21) Appl. No.: 18/390,514

(22) Filed: Dec. 20, 2023

(65) Prior Publication Data

US 2024/0221460 A1 Jul. 4, 2024

Related U.S. Application Data

(60) Provisional application No. 63/477,786, filed on Dec. 29, 2022.

(51) Int. Cl.
*G07F 17/32* (2006.01)

(52) U.S. Cl.
CPC ...... *G07F 17/3213* (2013.01); *G07F 17/3216* (2013.01); *G07F 17/3209* (2013.01)

(58) Field of Classification Search
CPC ......................... G07F 17/3216; G07F 17/3213
See application file for complete search history.

(56) References Cited

U.S. PATENT DOCUMENTS

| | | | | |
|---|---|---|---|---|
| 10,537,788 | B2 * | 1/2020 | Bergant | G07F 17/3202 |
| 10,835,808 | B2 * | 11/2020 | Bergant | A63F 9/0406 |
| 2007/0060259 | A1 | 3/2007 | Pececnik | |
| 2008/0148638 | A1 | 6/2008 | Knowles | |
| 2009/0224475 | A1 * | 9/2009 | Hsu | A63F 9/0406 273/146 |
| 2011/0018194 | A1 | 1/2011 | Nicely et al. | |
| 2018/0104572 | A1 * | 4/2018 | Bergant | G07F 17/3202 |

(Continued)

FOREIGN PATENT DOCUMENTS

| | | | |
|---|---|---|---|
| CN | 111414918 | A | 7/2020 |
| TW | 200915192 | A | 4/2009 |
| TW | M359360 | U | 6/2009 |

(Continued)

OTHER PUBLICATIONS

International Patent Application No. PCT/US2023/085861; Int'l Search Report and the Written Opinion; dated Apr. 23, 2024; 22 pages.

(Continued)

*Primary Examiner* — Jasson H Yoo
(74) *Attorney, Agent, or Firm* — BakerHostetler

(57) ABSTRACT

A method for revealing one or more dice results. The method comprising vertically driving a movable platform for each of N separate dice systems to vertically throw at least one dice in an enclosed space for each corresponding dice system among the N dice systems. When the at least one dice has settled within the enclosed space, detecting upward facing pips on each of the settled dice to indicate a dice result for each corresponding dice system. The method further comprising receiving a selection of X dice systems among the N dice systems, visually indicating the selection of the X dice systems, and raising a mechanical shutter for each of the X dice systems to reveal the dice result for each corresponding dice system among the X dice systems.

19 Claims, 15 Drawing Sheets

(56) References Cited

U.S. PATENT DOCUMENTS

| | | | |
|---|---|---|---|
| 2020/0086205 | A1 | 3/2020 | Bergant et al. |
| 2021/0101073 | A1 | 4/2021 | Bergant et al. |

FOREIGN PATENT DOCUMENTS

| | | | |
|---|---|---|---|
| TW | 202000281 | A | 1/2020 |
| TW | 202122139 | A | 6/2021 |
| TW | 1751881 | B | 1/2022 |
| TW | 202228819 | A | 8/2022 |

OTHER PUBLICATIONS

International Patent Application No. PCT/US2023/085861; Int'l Preliminary Report on Patentability; dated Jan. 8, 2025; 13 pages.

* cited by examiner

200a

200b

METHOD FOR REVEALING DICE RESULTS

CROSS REFERENCE TO RELATED APPLICATIONS

This application claims benefit under 35 U.S.C. § 119(e) of Provisional U.S. Patent Application No. 63/477,786, filed Dec. 29, 2022, the contents of which is incorporated herein by reference in its entirety.

TECHNICAL FIELD

This disclosure relates generally to gaming systems, and more specifically to automatic gaming systems that implement dice, such as craps and sic bo.

BACKGROUND

Gaming systems, and particularly automatic and/or electronic gaming systems, are becoming more common. Current gaming systems can automate many functions, so as to eliminate a dealer or human presence required to facilitate playing various games. One example of this is the game of craps. Current systems employ dice systems which can roll actual dice in a controlled environment and get a reading from the dice to enable playing of games, such as craps, without a dealer. However, players want more from automated dice systems than just the same form of play that can be performed with dice on traditional table games. Players are looking for more exciting features that automated dice systems should make available.

SUMMARY

Illustrative examples of the disclosure include, without limitation, methods, systems, and various devices.

A method for revealing one or more dice results is disclosed. The method comprising vertically driving a movable platform for each of N separate dice systems to vertically throw at least one dice in an enclosed space for each corresponding dice system among the N dice systems. When the at least one dice has settled within the enclosed space, detecting upward facing pips on each of the settled dice to indicate a dice result for each corresponding dice system. The method further comprising receiving a selection of X dice systems among the N dice systems, visually indicating the selection of the X dice systems, and raising a mechanical shutter for each of the X dice systems to reveal the dice result for each corresponding dice system among the X dice systems.

Other features of the systems and methods are described below. The features, functions, and advantages can be achieved independently in various examples or may be combined in yet other examples, further details of which can be seen with reference to the following description and drawings.

BRIEF DESCRIPTION OF THE DRAWINGS

Embodiments of the present disclosure will be described more fully hereinafter with reference to the accompanying drawings, in which.

DETAILED DESCRIPTION OF ILLUSTRATIVE EMBODIMENTS

Figure 1A:
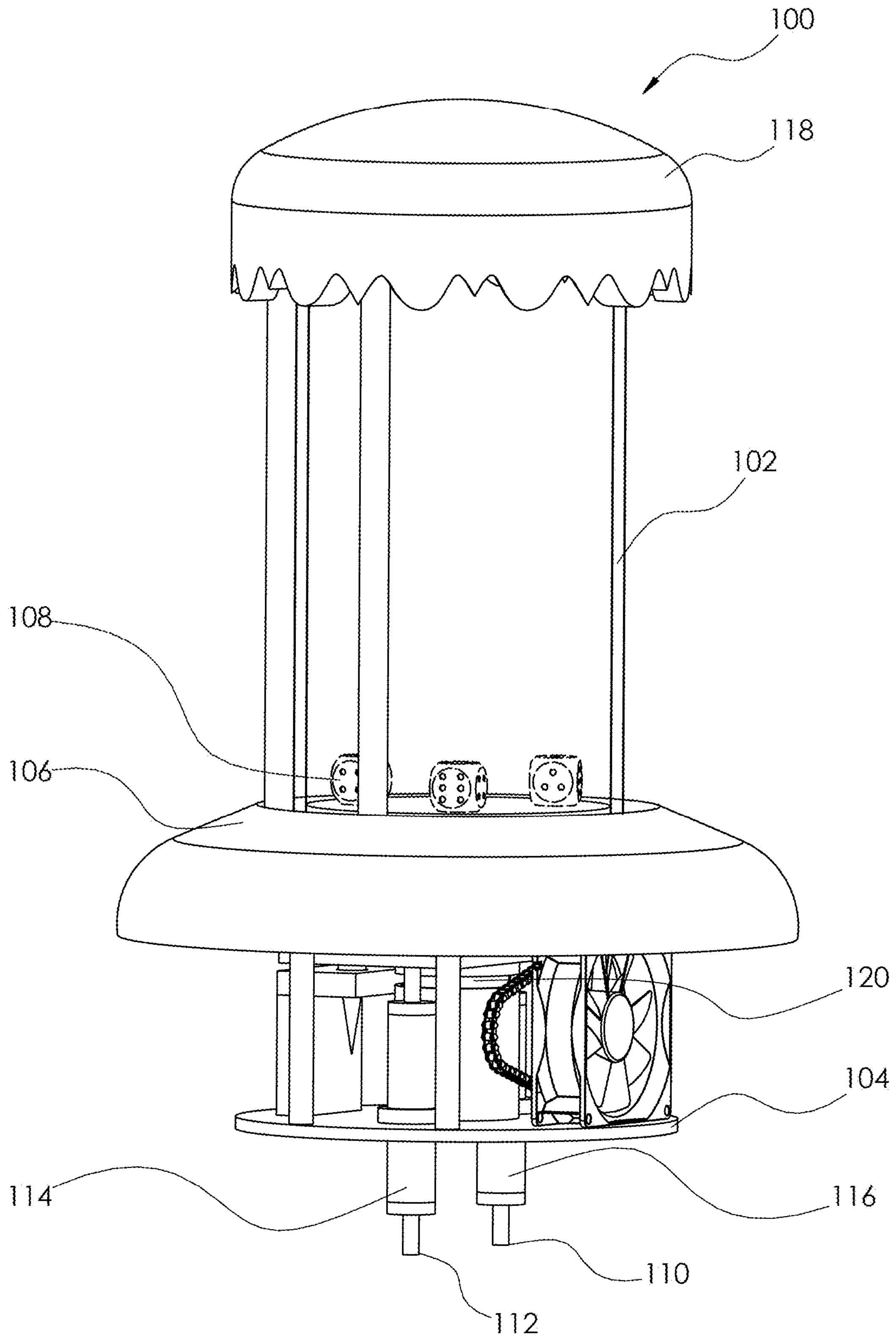
FIG. 1A depicts an example diagram of a dice system or generator for use with one or more gaming machines.
Figure 1B:
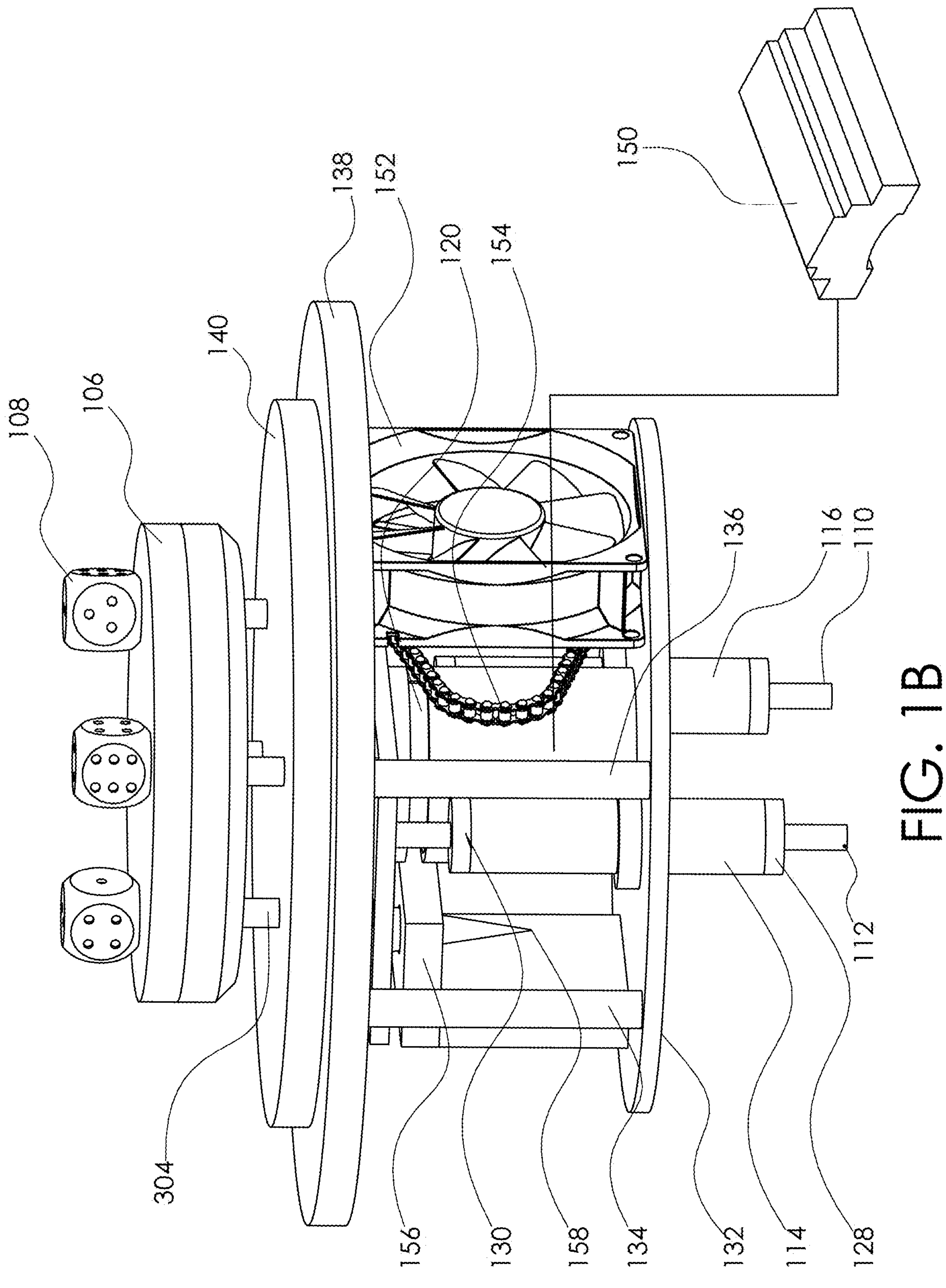
FIG. 1B depicts an example diagram of a dice system or generator for use with one or more gaming machines.
Figure 1C:
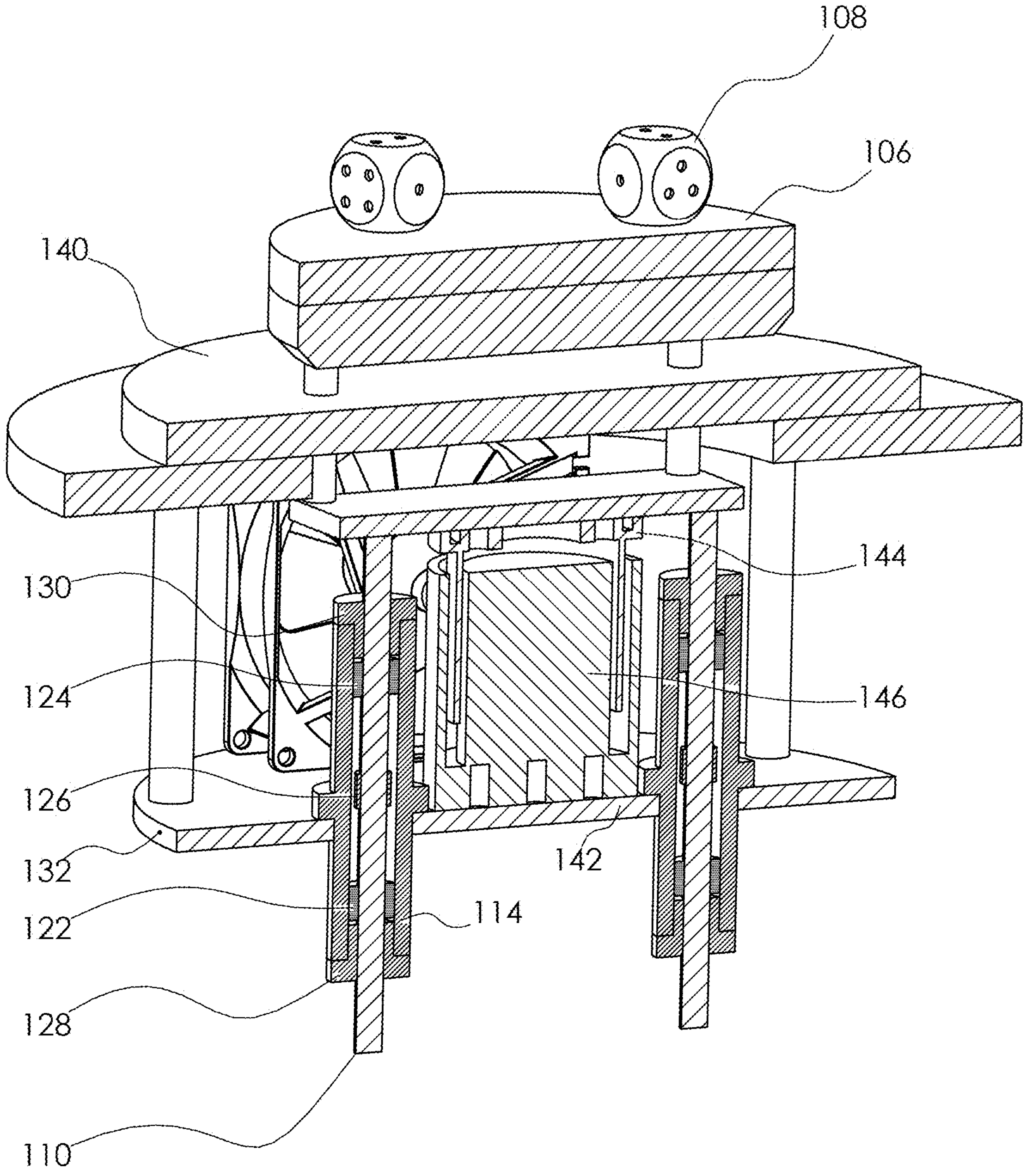
FIG. 1C depicts an example diagram of a dice system or generator for use with one or more gaming machines.
Figure 1D:
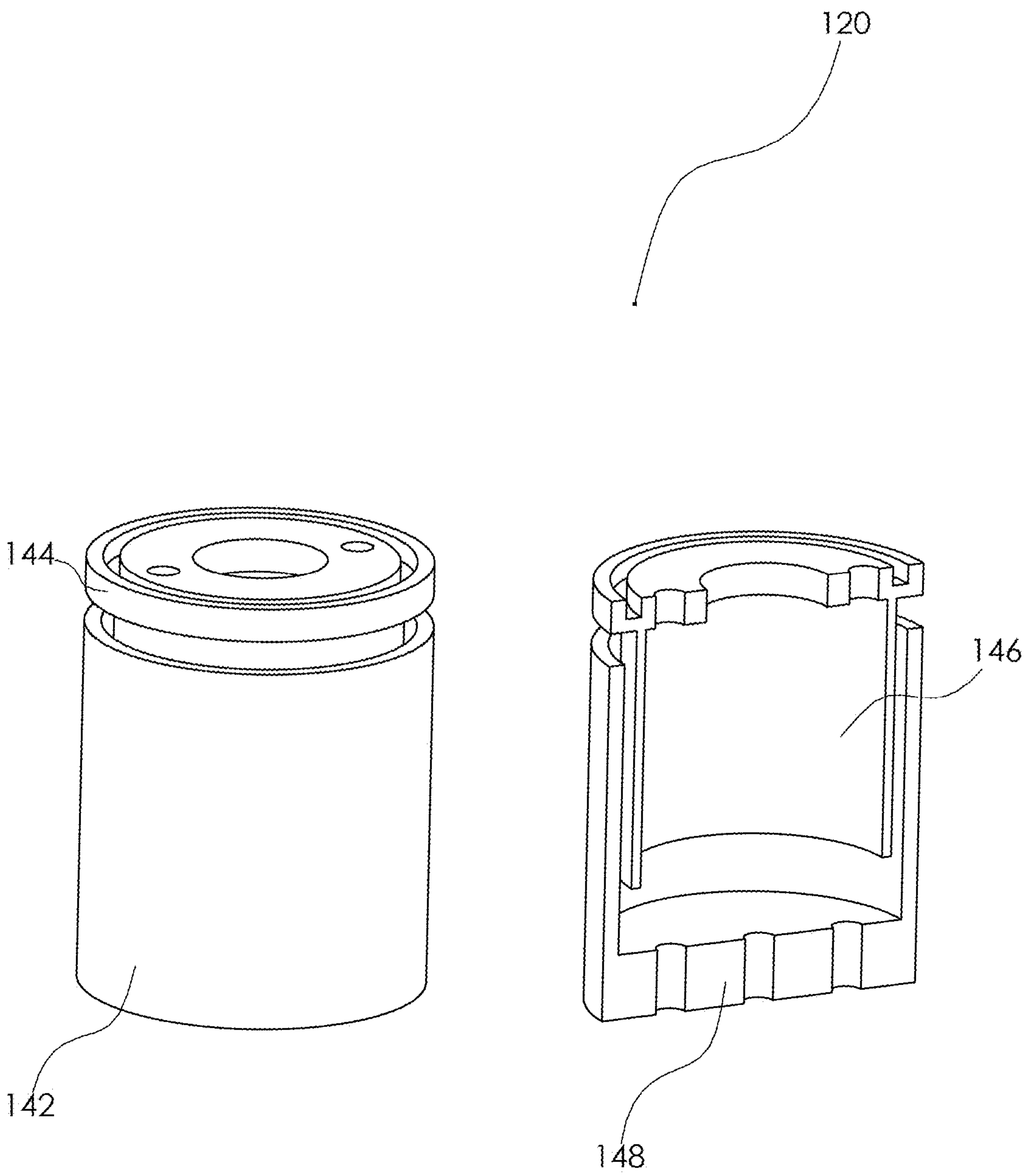
FIG. 1D depicts an example diagram of a dice system or generator for use with one or more gaming machines.

FIGS. 1A, 1B, 1C and 1D depict an example dice system 100 that includes a dice canister 102 coupled to a platform 106 that is movable in the vertical direction by drive means 104. The dice canister 102 may be made of a transparent or partially transparent material, such as glass, plastic, etc. The dice canister 102 may enclose a space above platform 106, for example, to hold one or more dice 108. In some cases, the canister 102 may be removable from the platform 106, for example, to add or subtract dice, for maintenance, etc. The canister 102 may be reinforced with one or more vertical members and may include a cap 118 that may include lighting, the wiring for which may be run up through supports for the canister 102 and cap 118. In some cases, the canister 102 and/or the cap 118 may be secured to the platform 106, for example, to prevent tampering with the dice 108 during play of a game using dice system 100.

The drive means or mechanism 104 may include a motor, such as a voice coil motor 120, that may drive the platform 106 up and down (e.g., in the vertical direction) separate from the canister 102. In some aspects, the drive means 104 may include other types of motors. In some cases, the drive mechanism 104 may be configured to move the platform 106 upward and may rely on gravity to move the platform 106 downward. However, in most implementations, the drive means 104 may be configured to move the platform both up and down, to control the forces applied to platform 106 so as to enable precise control of the throw of dice 108. This may enable the dice system 100 to guarantee that each dice roll or throw is random and not in correlation with the starting dice position, such as to comply with one or more gaming licensing regulations.

Figure 3:
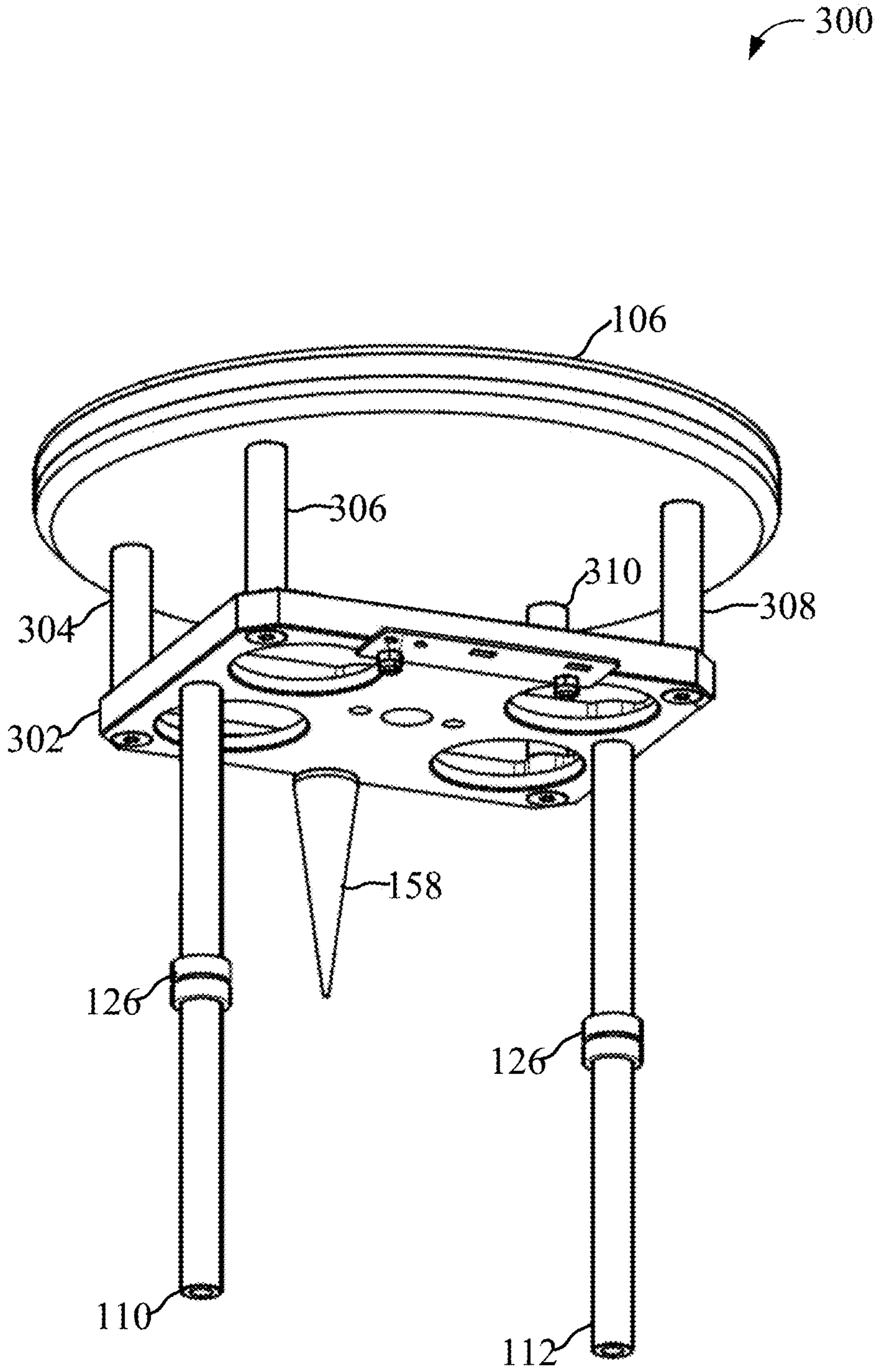
FIG. 3 depicts an example of a table assembly that may be used with a voice coil motor to move a platform configured to hold dice.

The drive means 104 may be fixed relative to the platform 106, to enable vertical movement of the platform 106 independently of the drive means 104 (e.g., so that the drive means 104 may remain stationary), thereby protecting the operation of the drive means 104. The platform 106 may be movable in at least the vertical direction via one or more support structures 304, 306, 308, 310 coupled to intermediary plate 302 (further described in FIG. 3), which is in turn coupled to the drive means 104. In the example illustrated, the platform 106 may also be coupled to two vertical shafts 110, 112. The shafts 110, 112 may move within sheaths or guides 114, 116 via one or more bearing or bushing assemblies, such as bearings 128, 130. The sheaths or outer cylinders 114, 116 may be fixed, for example to a base structure plate or platform 132, which remains stationary as the platform 106 moves up and down. An example of platform 106, coupled to shafts 110, 112 is illustrated in FIG. 3. Shafts 110, 112 may each have one or more magnets 126 attached thereto, which may be permanent magnetics. Sheaths 114, 116 may each include one or more magnets that function as magnetic movement limiters 122, 124. The magnetic movement limiters 122, 124 may be permanent magnetics. The magnetic movement limiters 122, 124 may be attached to an upper portion 130 and a lower portion 128 of each of sheaths 114, 116. The magnetic movement limiters 122, 124 may limit movement of shafts 110, 112 in the vertical direction via magnetic force, e.g., the magnet(s) 126 on each of shafts 110, 112 may be positioned to have an opposite polarization as magnetic movement limiters 122, 124.

In some aspects, the two shafts 110, 112 and upper and lower portions 128, 130 of the sheaths 114, 116 may form a guide system. Shafts 110, 112 may, in some cases, be coated with an oil-free lubricant (i.e., TEFLON), such that no oil is needed to help reduce wear and maintenance of the shafts 110, 112 and sheaths 114, 116. The magnets 122, 124 and 126 may cooperate to limit mechanical movement of the shafts 110, 112. In some cases, one magnet 126 may be attached to one or more of shafts 110, 112. Magnetic movement limiters 122, 124 may be placed at the top and bottom of sheaths 114, 116, so as to limit the maximum vertical movement of magnet 126, which may be positioned in between limiters of the portions 128, 130, which may also include an oil-free lubrication system. In another example, shaft 110 and/or 112 may include two magnets 126, spaced a distance apart from each other along shafts 110, 112. Magnetic movement limiters 122, 124 and portions 128, 130 may be positioned in between magnets 126, such that the upper limiter 124 may limit downward movement of shaft 110, 112, and lower limiter 122 may limit upward movement of shaft 110, 112. The position of movement limiters 122, 124 and magnet(s) 126 may determine the minimum and maximum vertical position shafts 110, 112 and hence platform 106. It should be appreciated that the above-described configurations of a magnetic braking system are only given by way of example. Other types of braking systems that similarly utilizes magnets are also contemplated herein.

The magnets (122, 124, 126) may replace prior systems, for example that utilized mechanical springs. By replacing the mechanical spring systems with magnetic brakes, reliability of the system may be increased. In some aspects game cycle counters may be provided in system 100 that monitor usage of various components of system 100 and provide maintenance information of the components. The maintenance information may include lifetime and replacement information of dice 108, container 102, and other components, such as a vibration area of the platform 106, etc. In some aspects, the counters may provide a warning or indication that one or more components need to be replaced. With use of magnetic brakes, the maintenance interval of the braking system may be greatly increased.

In one example, using the magnetic brakes (122, 124, 126) may reduce the weight of platform 106, for example, to 1.8 lbs. (0.8 kg). As a result of the weight savings, the magnetic braking system may also reduce the power needed to move the platform in the vertical direction. The weight savings may also reduce the impact of vibrating the platform on surrounding systems, such as brackets, and other mechanical structures.

In some cases, the use of the magnetic brakes and/or drive means 104 may increase the height at which the dice can be thrown as well as reduce the time that is needed to throw dice 108 and to determine which dice 108 are facing upwards, so as to determine what score is associated with the throw, in less time than previous systems.

The magnet(s) 126 and magnetic movement limiters 122, 124 of each shaft or member may limit movement of the platform 106 in the vertical direction without utilizing springs or other similar systems of previous designs. As a result of using magnetic limiters, the described system may be more durable, last longer, require less maintenance, require less replacement of parts, etc. In some cases, the fixed portion of system 100 may include the drive means 104, which may include part of voice coil motor 120, a plate or platform 132 on which the sheaths 114, 116 and voice coil motor 120 is mounted, one or more supports 134, 136, that couple the plate 132 to an upper plate or platform 138, upon which an RFID detection device or plate (e.g., including a microcontroller) 140 may be placed, attached, mounted, etc. The RFID detection device 140 may detect the one or more dice 108, which may each include a number of RFID tags or chips. Each chip may correspond to a face of each dice 108 on which is displayed the pips of the dice 108. In some examples an RFID tag or chip for a given pip on a face, say a “2”, may be located opposite the face showing a “2.” In this way, when the die is laying on platform 106, and a “2” is facing upwards where players can see it, the RFID detection device 140 may detect the closest RFID tag as the one corresponding to the number “2.”

In some cases, the drive means 104 may include a voice coil motor 120. Voice coil 120 may include a first cylinder or cylindrical portion 142, and a second cylindrical portion 144. Portion 144 may fit at least partially inside of cylinder portion 142. Portion 144 may be substantially hollow and may house windings 146, for example, made out of copper. Portion 142 may include a permanent magnet 148. Drive mechanism 104 may also include a power source 150, electrically connected to voice coil motor 120 for driving the voice coil motor 120. When current is applied to the voice coil motor 120 via power source 150, a magnetic field is produced. This magnetic field causes the voice coil motor 120 to react to the magnetic field produced by the permanent magnet 148 fixed to the portion 142, thereby moving the portion 144 of the motor 120. For example, driving current through the windings 146 in one direction may drive the portion 144 in one direction and driving current through the windings 146 in the opposite direction may drive the portion 144 in the opposite direction. Movement of the portion 144 may be highly controlled for micro-positioning in this manner. In some cases, the power source 150 may include voice coil driver module and/or voice coil driver for regulating control of the voice coil motor 120, and a UPS module for backup and power bursts.

As the moving parts (i.e., portion 142 and its coil 146) of the voice coil motor 120 do not contact the stationary parts (i.e., portion 144 and its magnet 148), there is no mechanical wear on the voice coil 120 and there are no sensitive mechanical parts (wheels, straps, bearings, motor) required for creating fast dynamic movements. A voice coil motor 120 may also be chosen as it may be placed at a number of different locations in dice system 100 to effectuate vertical movement of platform 106, with minimal modification of other components. The voice coil motor 120 may also be configured to provide arbitrary movement frequency (e.g., up to 100 Hz), amplitude and offset, such that it may be completely customizable to different system 100 designs. In some cases, the voice coil motor 120 may vibrate the platform 106, for example across a wide frequency range, to settle the dice so that one face of each dice is facing upwards, to simulate rolling of the dice in a player's hand, and for other reasons. In some cases, the voice coil motor 120, in conjunction with other components of system 100 may enable throwing of dice 108 up to 14 inches or 35 cm above the platform 106, to simulate a player rolling the dice 108.

It should be appreciated, that other drive means 104 are contemplated herein, such that the described techniques may be implemented in a similar manner with these other drive means 104 (e.g., other motor types, in different physical configurations).

In some aspects, a fan 152 or other cooling mechanism may be provided proximate to the drive means 104, for example, to ensure safer and longer operation of drive means 104. In some cases, a flexible retention device 154, such as a hollow chain, may be used to hold wiring to the RFID detection device 140, so the wiring may be flexed each time the platform 106 moves without overly stressing the wiring.

In some aspects, system 100 may include a displacement sensor 156, for example, attached to plate 132. The platform 106 may be connected to a device or structure 158 that may move proximate to displacement sensor 156, for example, to enable measuring displacement of platform 106 relative to drive means 104 (or other fixed portions of system 100). During operation of the dice system 100, theoretical displacements of the platform 106 may be selected randomly by a random number generator associated with the power system 150 (either incorporated into the driving system of the power system or input to the driving system from another outside computer component). The theoretical displacements may be referred to as the stroke or throw of the dice that is desired. As further described below, the stroke or throw may involve multiple controlled movements of the platform 106 so as to achieve a desired throw of the dice. The displacement sensors 156, 158 may measure the actual displacements of the platform 106, which may be compared to the theoretical displacement, as more fully described below, in a form of a closed loop feedback system, so as to monitor and adjust the accuracy of the dice system 100 continually over time.

Figure 2A:
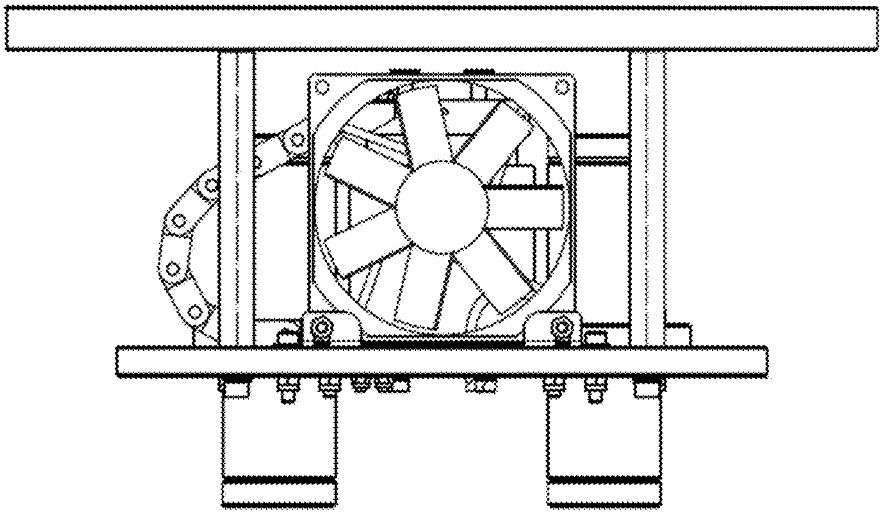
FIG. 2A depicts an example diagram of a dice system or generator for use with one or more gaming machines.
Figure 2B:
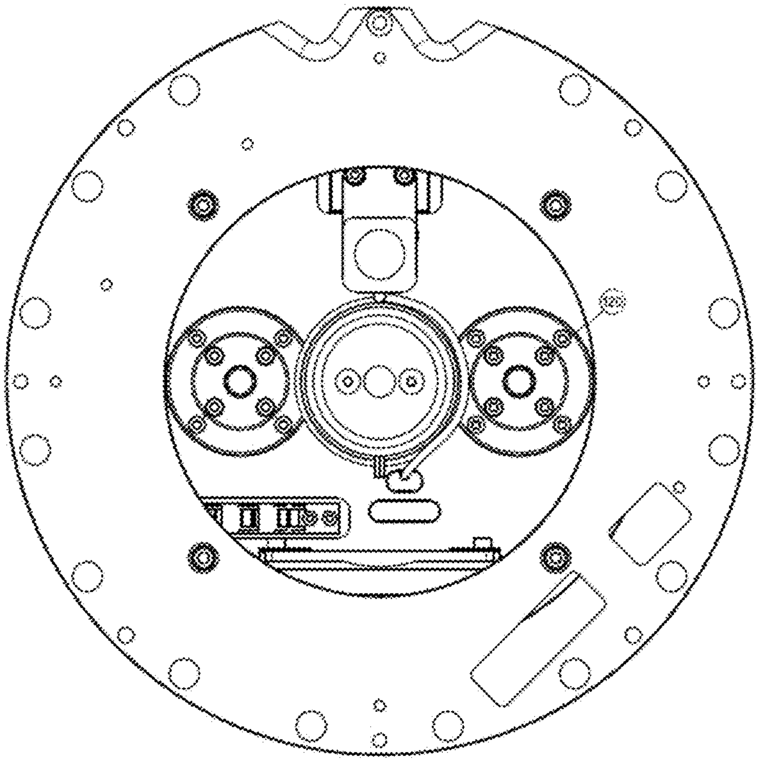
FIG. 2B depicts an example diagram of a dice system or generator for use with one or more gaming machines.
Figure 2C:
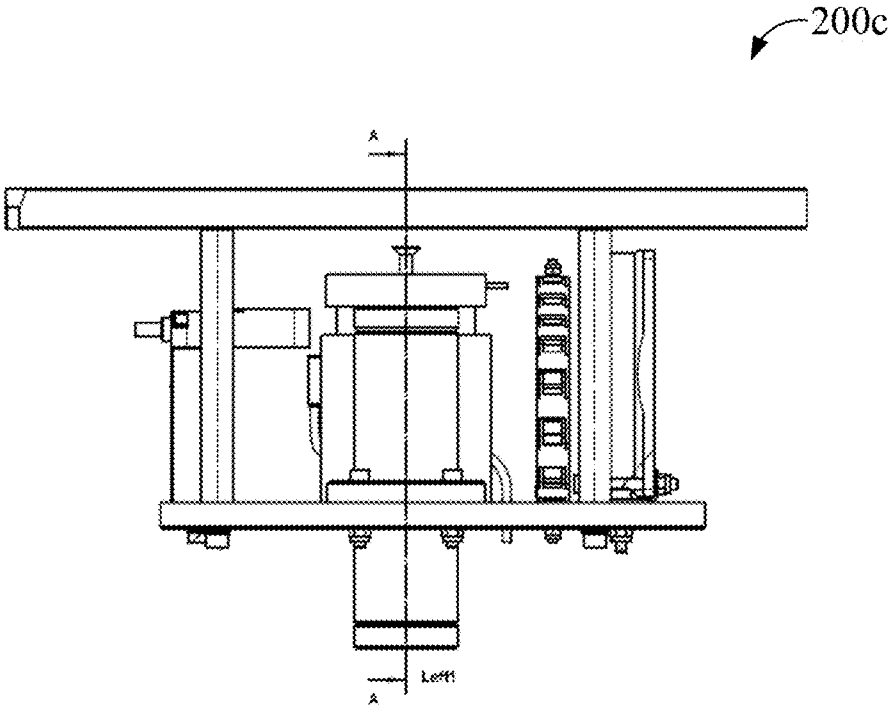
FIG. 2C depicts an example diagram of a dice system or generator for use with one or more gaming machines.
Figure 2D:
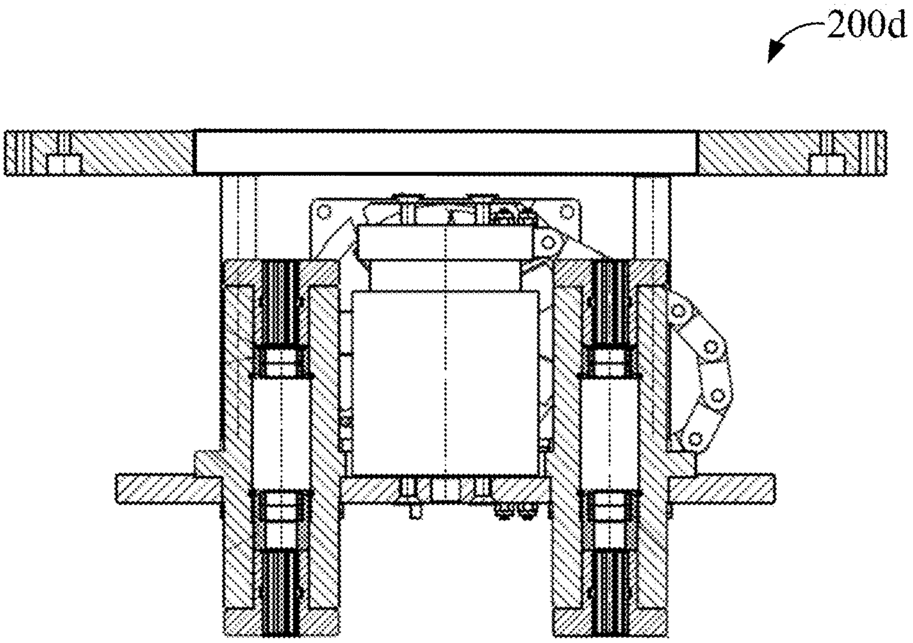
FIG. 2D depicts an example diagram of a dice system or generator for use with one or more gaming machines.

FIGS. 2A, 2B, 2C, and 2D depict perspective views of portions of system 100 of FIGS. 1A, 1B, 1C and 1D. FIG. 2A illustrates a front view 200*a* of drive means 104. FIG. 2B illustrates a top view 200*b* of drive means 104 and platform 106. FIG. 2C illustrates a side view 200*c* of drive means 104. FIG. 2D illustrates a cross-sectional side view 200*d* of drive means 104.

FIG. 3 depicts an example of a platform assembly 300 that may be moved in the vertical direction and/or vibrated by drive means 104. As illustrated, platform assembly 300 may include platform 106 and an intermediary plate 302 coupled to the platform 106 via a number of support structures 304, 306, 308, 310. Shafts 110, 112 may extend from the intermediary plate 302 away from the platform 106. A structure 158 used in conjunction with a displacement senor 156 (not shown) for measuring displacement of the platform assembly 300 relative to drive means 104 may extend from the intermediary plate 302, away from platform 106.

In one example, portion 144 of voice coil motor 120 may attach to a surface of the intermediary plate 320 (e.g., a surface facing away from platform 106). Upon activation, the voice coil motor 120 may move the platform assembly 300 in the vertical direction and/or vibrate the platform assembly 300, with the shafts 110, 112 guided by sheaths 114, 116. The magnet(s) 126 attached to the shafts and the magnetic movement limiters 122, 124 may limit the vertical movement of the shafts 110, 112 and hence the platform assembly 300.

In some examples, RFID detector plate support structures 140 may have one or more holes or openings corresponding to support structures 304-310. In this way, platform assembly 300 may move vertically with respect to RFID detector plate 140, such that RFID detector plate 140 does not move with platform 106. As RFID detector plate 140 only needs to be able to read the RFID tags of the dice once the dice have settled on the bottom of the platform 106, the fact that RFID detector plate 140 does not move with platform 106 does not negatively impact operation of RFID detector plate 140.

In some aspects, the power system 150 may also control the precise movement of drive means 104/voice coil motor 120, to change the characteristics of movement of platform 106, to effectuate different throw characteristics of the dice 108, and to perform other functions.

In some aspects, power system/drive control 150 may also, via feedback from drive means/voice coil motor 120 and/or one or more temperature sensors, measure temperature of the drive means 104/voice coil motor 120 in operation. The power system 150 may monitor the temperature of drive means 104/voice coil motor 120 to ensure it does not overheat, potentially causing damage to drive means 104 and other components of dice system 100. Upon detecting an overheat condition, the power system 150 may temporarily cease providing power to drive means 104/voice coil motor 120 to prevent any damage being caused to drive means 104/voice coil motor 120. In some aspects, the power system 150 may resume supplying power to drive means 104/voice coil motor 120 upon expiration of a configurable time period, upon detection of a temperature of the drive means 104/voice coil motor 120 being within a safe operable range, and the like.

Additional details regarding the power system 150, RFID detection, and dice throw control of the automated dice system may be found in commonly assigned U.S. Pat. No. 10,537,788, which is incorporated herein by reference.

Figure 4:
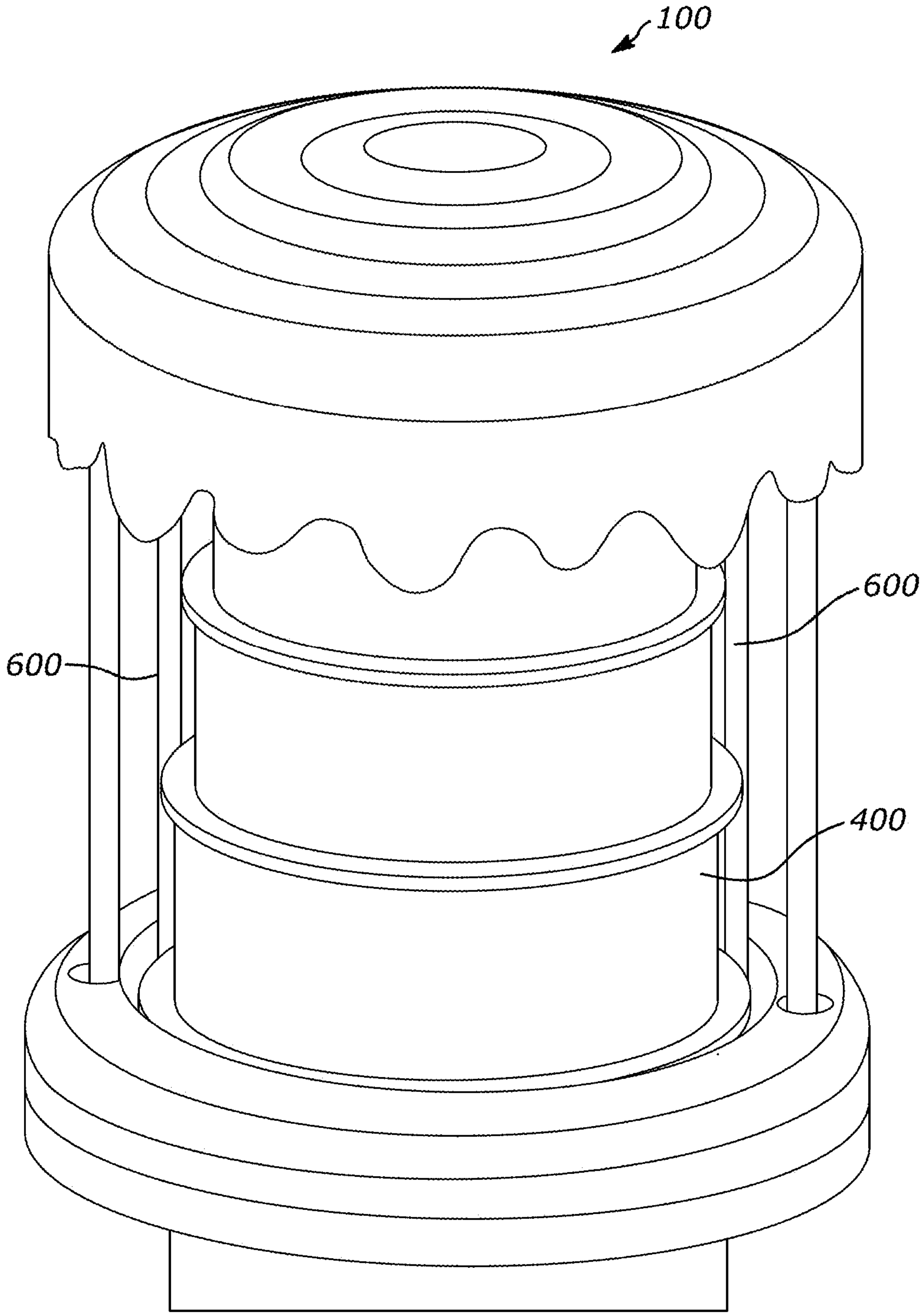
FIG. 4 depicts an illustration of a dice system with a fully closed shutter system.
Figure 5:
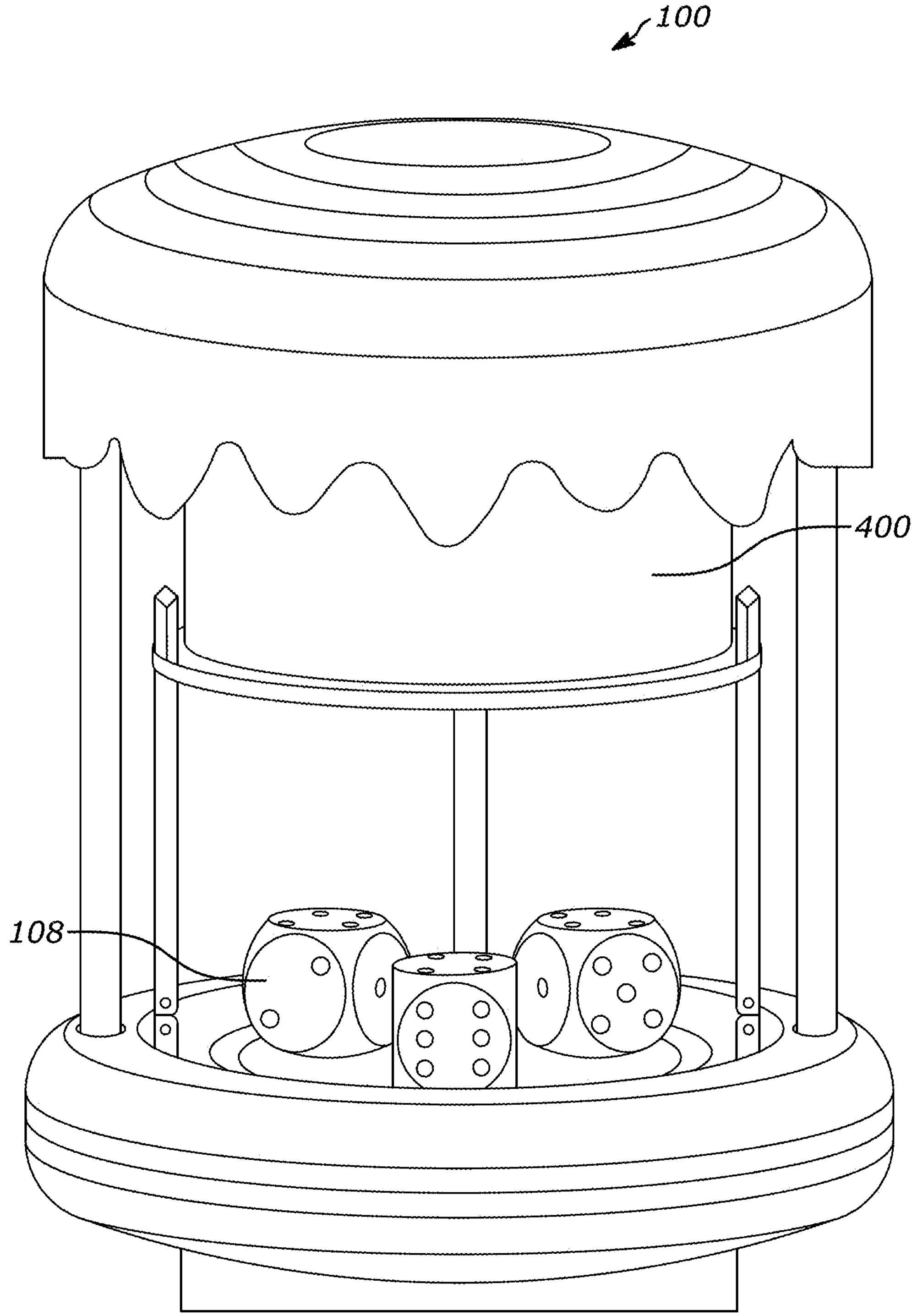
FIG. 5 depicts an illustration of a dice system with an open shutter system.
Figure 6:
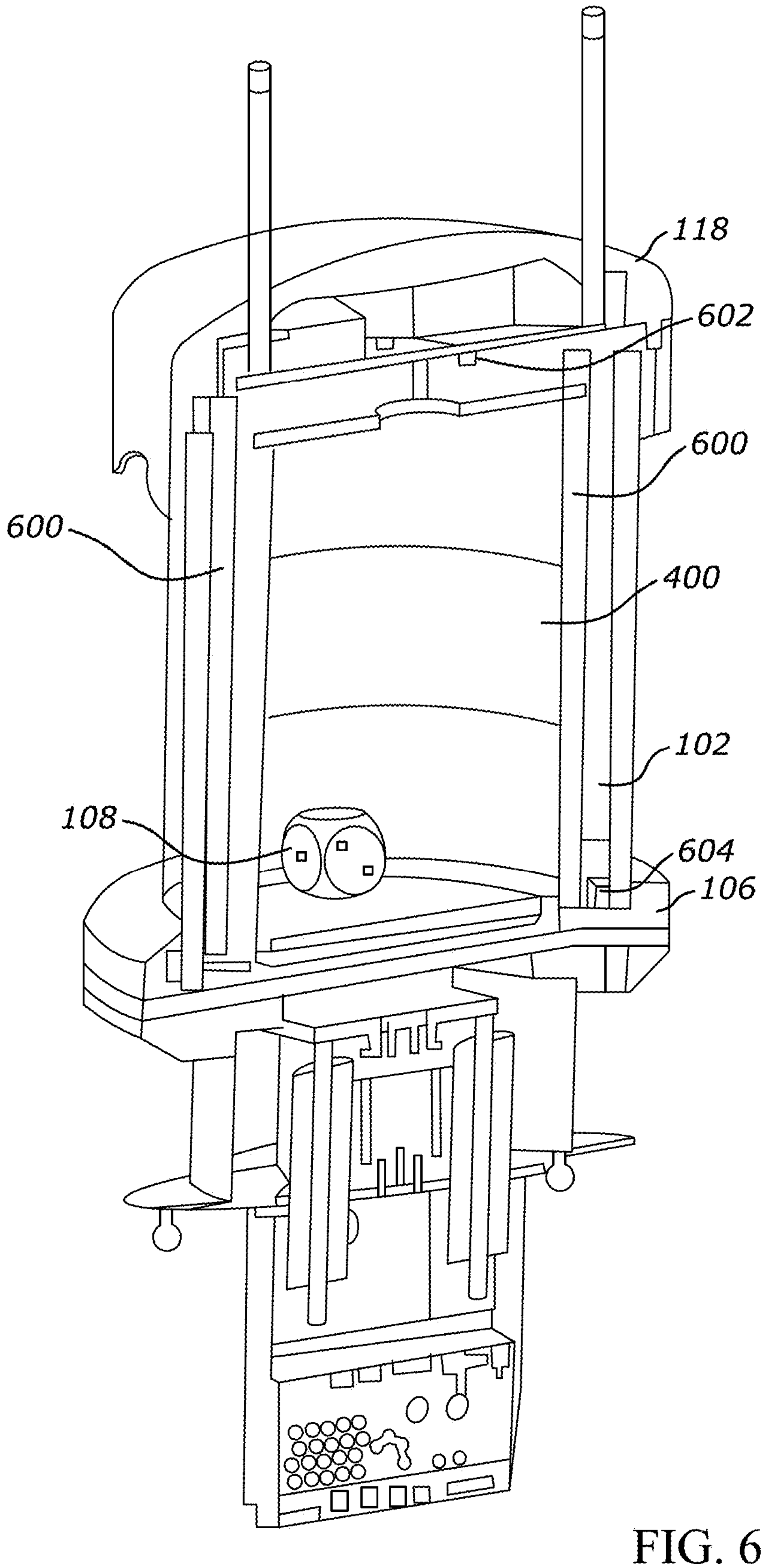
FIG. 6 is a cross-section view of a dice system illustrating the belts and belt drive system for the shutter system.

In an embodiment, a shutter mechanism may be added to the dice system as illustrated in FIGS. 4 and 5 as a way of creating more anticipation of the result of the gaming system than would be possible with just the result itself. The shutter mechanism may be a telescopic cylinder driven by a belt drive motor more fully illustrated in FIG. 6. As shown in FIG. 4, the shutter 400 of the shutter mechanism is fully closed, or down, so that the dice within the dice system cannot be seen. As shown in FIG. 5, the shutter 400 is raised so that the dice 108 are fully visible. As shown in FIG. 6, the telescopic cylinder of the shutter 400 may be connected at the bottom of the shutter 400 by belts 600 on either side of the shutter 400 but within the dice cylinder 102, which belts may be driven by a belt drive motor system 602 on top of the dice cylinder 102 but below the cap 118. While a belt drive motor and belts are discussed herein, the belts could be any type of flexible support that may be attached to the bottom portion of the shutter and raise the bottom portion and/or other intermediate portions and the drive motor could be any type of motor configured to raise and lower the flexible supports. The bottom portion of the shutter 400 may be larger in diameter than the middle portion of the shutter 400, which may be larger in diameter than the top portion of the shutter, such that when the bottom portion is raised it covers the middle portion. A limiter (not shown) between the middle portion and bottom portion would cause the middle portion to be raised with the bottom portion as the bottom portion if further raised toward the upper portion. Although three portions are shown, there could be two portions or any number of additional portions.

The automated shutter mechanism ensures that the shutter 400 is fully closed and the dice 108 are not visible to players when the dice 108 are intended to be hidden yet can be partially or fully visible at other times. For example, it may be desirable to allow players to continue placing bets on a game while the dice are being rolled, as that would speed up game play, but it also creates the potential for cheating. By being able to make the dice invisible during a roll, players can continue to place bets without any cheating risk and once the dice have settled, and also continue betting after the dice have settled until the shutter is raised to reveal the results. As an added layer of security, one or more optic sensors 604 may be installed in the platform or base 106 to ensure that the shutter 400 has reached its lowest possible point and is therefore fully closed. Measurement of the shutter being fully closed may help to prevent someone from manually attempting to open the shutter. The mechanical shutter system has advantages over dice systems with dice cylinder that include a film material or additive material that make the transparent cylinder opaque when an electrical current or other manipulation is applied to the material. Under certain circumstances, such as exposure to light at a particular spectrum or a high temperature, it is possible to see through the opaque material. The mechanical shutter system cannot be tampered with in such a manner ensuring that the dice are not visible when intended to be invisible regardless of the shutter's environment.

In addition to being fully opened (i.e., up) and closed (i.e., down), the shutter 400 can be positioned at numerous positions between opened and closed, which provide players with some additional exciting game play options. For example, the shutter may be fully opened so that the dice are completely visible when the dice begin to shake. Alternatively, the shutter may be partly closed so the dice are visible, but not completely, or anywhere in between fully opened and fully closed while the dice are moving. This allows players to be able to see and confirm that the dice are being rolled, even while still placing bets but without being able to cheat and guess the result because the shutter will be closed before the shaking process has completed.

Figure 7A:
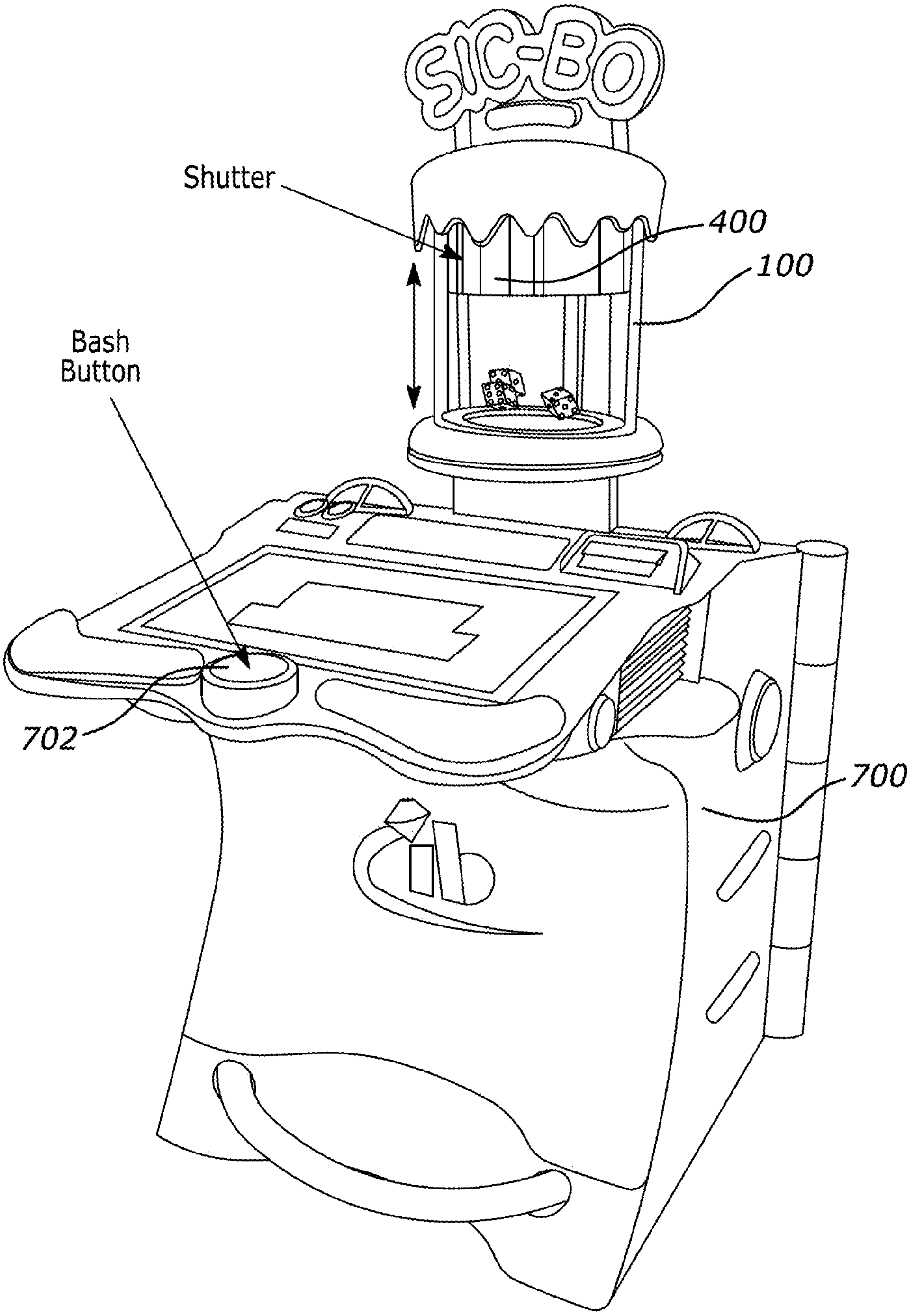
FIG. 7A depicts example gaming machines in which a dice system may be implemented.

In a further embodiment, the shutter system may be utilized to provide additional modes of action associated with the dice system. For example, as shown in FIG. 7A, a universal cabinet 700 having a display with user controls and dice system 100 is depicted. The universal cabinet 700 may be configured similar to a slot machine, in that the player may be presented a selection for starting a dice game and may control when the one or more dice of the dice system are thrown. In some aspects, due to requirements for precise control of the dice system, a random number generator may select one or more parameters for throwing the dice prior to the player activating the dice throw. Upon receiving a selection to initiate the dice throw, the dice system may then throw the dice according to the parameters dictated by the random number generator. In some cases, the dice system may vibrate the dice or possibly throw the dice, without affecting the final throw, to simulate that the player is actually controlling initiation of the dice throw, when in fact, the player is not.

The addition of the shutter system may allow the player to have further control of the game without changing any aspect of the randomness of the result. For example, in a first embodiment (i.e., Mode 1), once the dice throw has been completed and the shutter 400 is still closed, the player may gently touch the bash button 702 on the universal cabinet 700 to cause the shutter 400 to be opened slowly until it reaches the height of the dice so that the side of the dice are visible but not the top of the dice so as to not fully reveal the results. The optical sensors 604, or additional sensors may be used to verify the right location, which may be predetermined by the belt drive motor 602. Thereafter, if the player removes their hand from the bash button 702, the shutter 400 may fully close again, i.e., a tease as to the result. If the player presses down on the bash button 702, the shutter 400 may fully open and reveal the result.

In a second embodiment (i.e., Mode 2), once the dice throw has been completed and the shutter 400 is still closed, the player may gently touch the bash button 702 on the universal cabinet 700 to cause the shutter 400 to be opened slowly until it reaches the height of the dice so that the side of the dice are visible but not the top of the dice so as to not fully reveal the results. Thereafter, if the player removes their hand from the bash button 702, the shutter 400 may remain in the same position, neither fully closing nor fully opening. If the player presses down on the bash button 702, the shutter 400 may fully open and reveal the result.

In a third embodiment (i.e., Mode 3), once the dice throw has been completed and the shutter 400 is still closed, the player may gently touch the bash button 702 on the universal cabinet 700 to cause the shutter 400 to be opened slowly until it reaches the height of the dice so that the side of the dice are visible but not the top of the dice so as to not fully reveal the results, but once that position of the shutter 400 has been reached the shutter may automatically fully opens. If the player wants to see the result right away or tires of the shutter 400 slowly opening, the player may press down on the bash button 702 to cause the shutter 400 to fully open and reveal the result.

Figure 7B:
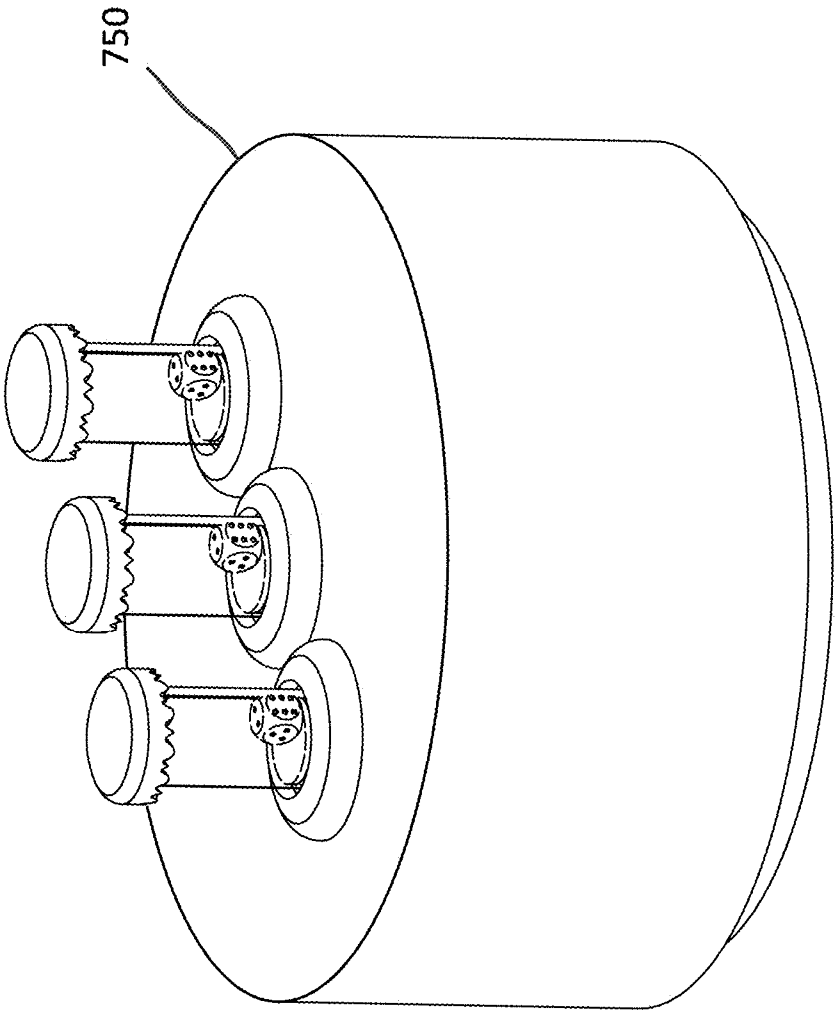
FIG. 7B depicts example gaming machines in which a dice system may be implemented.

FIG. 7B depicts a game table 750 having three separate dice systems 100. Although not shown in FIG. 7B, the game table 750 may have one or more player stations or consoles positioned around it. The player stations may be similar to the universal cabinet 700 in that each station includes its own display, bash button, bill validators, card reader/printer, etc., but different in that they may not include some of the same equipment such as dice random number generators. In a game played with the game table 750, a player may choose two out of three dice generators to play a dice game, such as craps, after the shutters have been closed on all three dice systems and the dice have been rolled. While the dice are being rolled, the player may place a bet on the results. Once the roll has completed, the player may then get to pick which two of the three dice systems or generators to have the shutters raised to reveal the rolled dice. Permitting the player to pick which two of the three dice systems to reveal does not change the randomness of the result because all three dice generators were operated randomly, the player just gets to pick which two to reveal. In an embodiment, the player may also select an option, such as hitting a bash button, to start the process of stopping the dice from rolling or shaking. The force by which a player hits the bash button may determine the height of a final jump of the dice that occurs when the hit occurs. This allows the player to determine when the final jump occurs. However, the player does not actually determine the result of the dice system 100 by hitting the bash button because there is a subsequent timeout during which the dice continues shaking that assures the randomization of the dice and prevents any interference of the result by the player. In the absence of the player selecting the option to hit the bash button, the height of the final jump may be determined randomly. In another example, the player may select an option to throw the dice, which throw is still randomly generated and not based on the player's actions at all. In an embodiment, bets may be made during a period prior to the dice being thrown and the placement of bets would be stopped before the dice could be thrown. In an embodiment, bets are not placed until the shutters 400 have been fully closed, at which point all three of the dice may be thrown while betting continues. Once the dice have settled after the throw, a player designated as the shooter may select which two shutters are to be opened to show the results of the dice throw.

Figure 8:
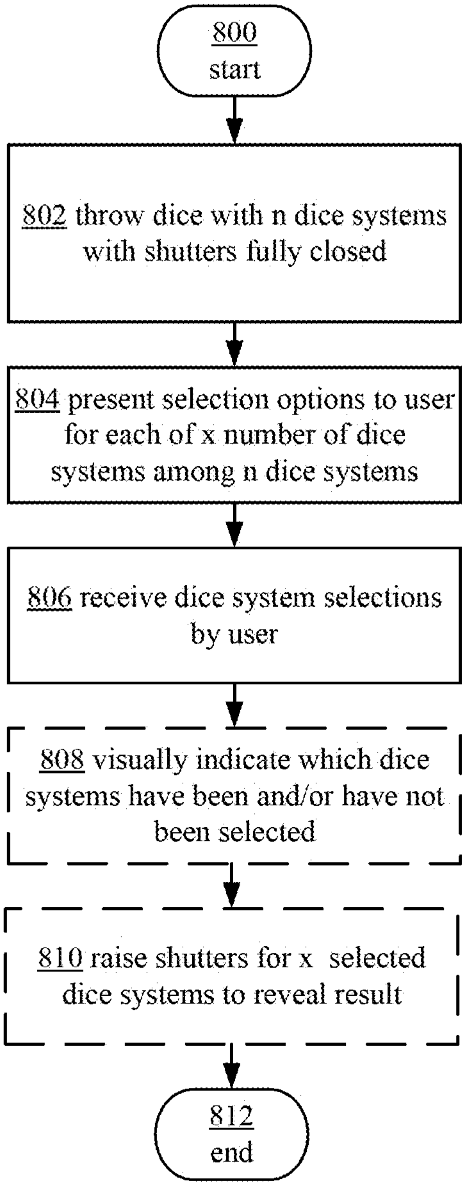
FIG. 8 depicts an example process for selecting at least one out of any number of dice systems for a gaming system or table.
Figure 9:
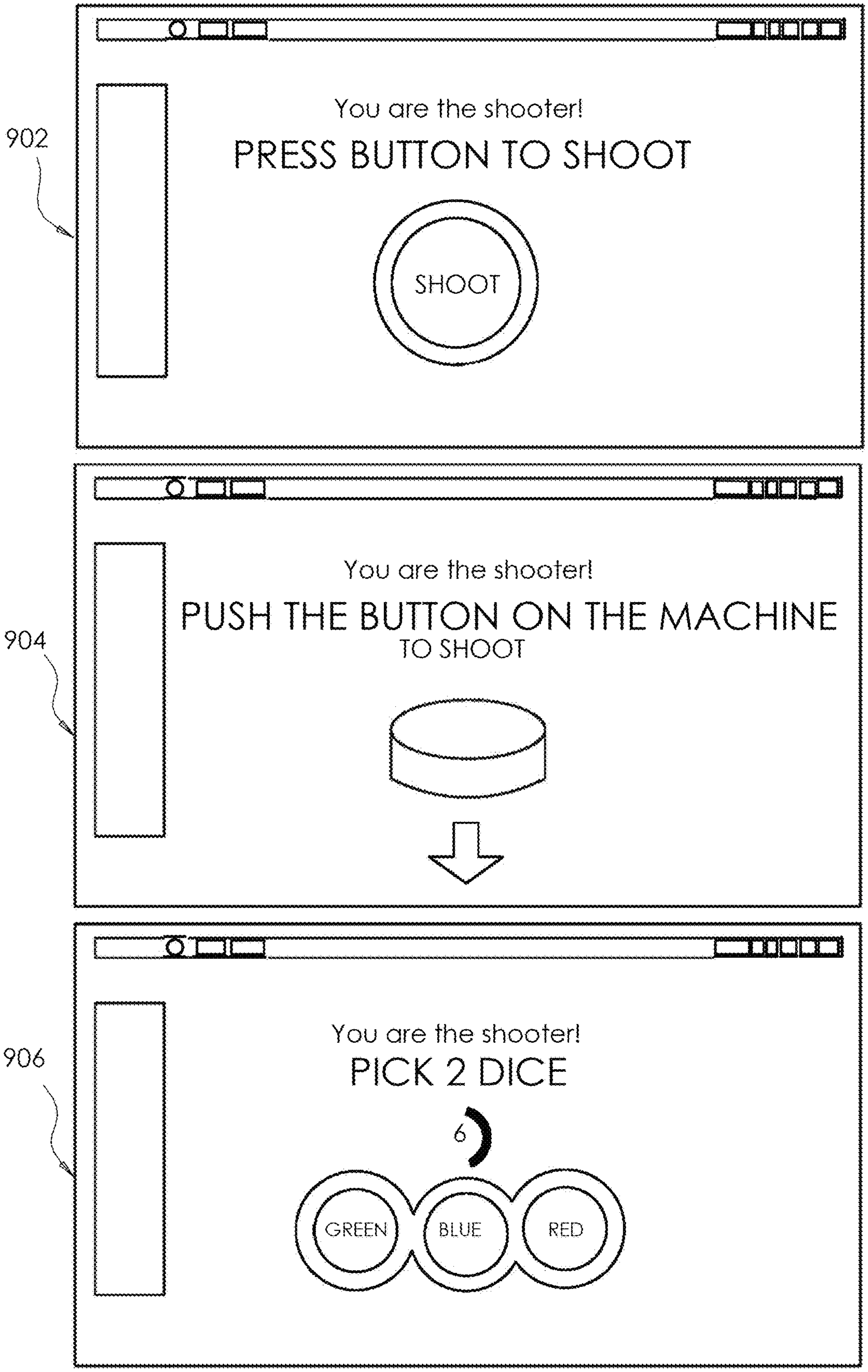
FIG. 9 depicts an example graphical user interface that may be used in conjunction with a dice system.

FIG. 8 depicts an example process 800 for selecting at least one out of any number of dice systems for a gaming system or table. Process 800 may be used, for example in one or more gaming tables or cabinets that utilize more than one dice system, such as the game illustrated in FIG. 7B, a craps game, sic bo, a Yahtzee-brand game or other games utilizing multiple dice. Process 800 may be executed by one or more controllers of a game table or console. In one example, after n dice systems have been thrown with shutters fully closed a player may select one or more of the dice systems to have the shutters open and to reveal a result, via one or more user interface selection options, presented either as a graphical user interface on a display device associate with the gaming machine or table, or via the interface together with one or more physical selection items, such as a display button or a physical button such as the bash button 702 of FIG. 7A. An example user interface for selecting one or more dice systems to be revealed is illustrated in FIG. 9. By providing the user the option to select which dice system(s) will be revealed, a more engaging and interactive user experience may be provided. In addition, by providing selection of one or more dice systems from a plurality of dice systems, the user may think he or she has more control over the play of the dice game, when in fact because the throw is randomly determined by a computer in advance of the shutters being raise, no more control is actually given.

Process 800 may begin at operation 802, where the dice within n dice selection systems, with shutters fully closed, may be thrown. Next, in operation 804, the user designated as the shooter may be presented with selection options, which may include a button or area within a graphical user interface, for example, provided by a display device associated with their player station or console, or may include one or more physical buttons, as illustrated by bash button 702. During the selection option, the user/player may select each of the x number of dice systems to be revealed. At operation 806, the gaming system may receive the dice systems selections for use in a current game. In some aspects, a gaming table may provide 2, 3, 4, 5, or other number of n separate dice systems or generators. The gaming system may be configured to enable selection by a player/user of any number x of the n dice systems. Upon receiving one or more selections from the player (or randomly by computer), the gaming system may visually indicate which x dice system(s) have been selected, at operation 808. In some aspects operation 806 may include powering on one or more lights, LEDs, or other illumination source proximate to the selected dice system, such as the lighted cap 118 or other lighting below the dice system. In some aspects of process 800, dice systems that are not selected may also be visually indicated, in contrast to the selected dice systems. In some aspects, this may include turning off all lights or illumination sources proximate to the un-selected dice system(s). In some systems, mechanical, electro-mechanical, or magnetic elevators could be used to lower un-selected dice system from being viewed at all by lowering the dice systems into the housing of the game, until the game is over than the dice systems are raised back up.

In some aspects of process 800, where a player refused to select x dice or takes too long to do so, operation 804 may be performed automatically and randomly, after a configurable time period. Once the x number of dice systems to be revealed have been selected or automatically determined, in operation 810, the shutters for the x selected dice systems are raised or opened to reveal the result. In an embodiment, the player may also be allowed to raise the shutters for the x selected dice system in accordance with one or more modes of operation. Three such exemplary modes of operation, Mode 1, Mode 2 and Mode 3, as described herein.

FIG. 9 depicts an example graphical user interface that may be used in conjunction with a dice system 100 and/or gaming machines. FIG. 9 illustrates an example graphical user interface of the game of FIG. 7B. When a player has been selected to be the shooter, they would see display screens 902 and/or 904 indicating that the player was selected to be the shooter and directing the player to press the "shoot" button, display screen 902, or the bash button, display screen 904, to cause the 3 dice systems to be thrown. Either before the button is pressed or upon pressing the button, the shutters of the dice systems would be closed and the throws would thereafter be initiated. Once the dice systems have been thrown, the player/user would be invited to select or pick the dice systems to be revealed, display screen 906.

In another example, instead of three dice systems, the game could have 2, 4, 5 or n dice systems and the player could be selecting an x number of dice systems. Selecting x of the circles corresponding to the dice system on the display screen, either by touching the screen or using some other type of control device, such as a physical, optical or sensor-based device on the play station, such as the bash button, results in highlighting of the selected circles and corresponding dice systems, as previously described. If the player does not do this before a timeout occurs, the selections may be automatically randomly made. If the player makes selections but then does not open the shutters before the time out, then the selected dice systems will be revealed. If the player selected one or more dice systems, but fewer than the required number of dice systems, before the timeout, then a new timeout may be set and the process restarted for the remaining dice systems. Once the dice systems have been selected, the player may then be given the option at display screen for performing the reveal in accordance with a mode of operation, such as Mode 1, Mode 2 and Mode 3, such to the timeout as noted above.

In another embodiment, the dice system may be operated in a physical location remote from a player placing bets associated with the dice system. From an Internet connected computer in communication with the dice system, the player may access a betting layout configured to enable the player to place one or more bets by placing a betting amount at different locations of a graphical user interface associated with the dice system. After the dice have been thrown, the player may operate one or more buttons of the graphical user interface to cause the shutters of one or more dice systems to be raised in accordance with any of the methods described herein.

Figure 10:
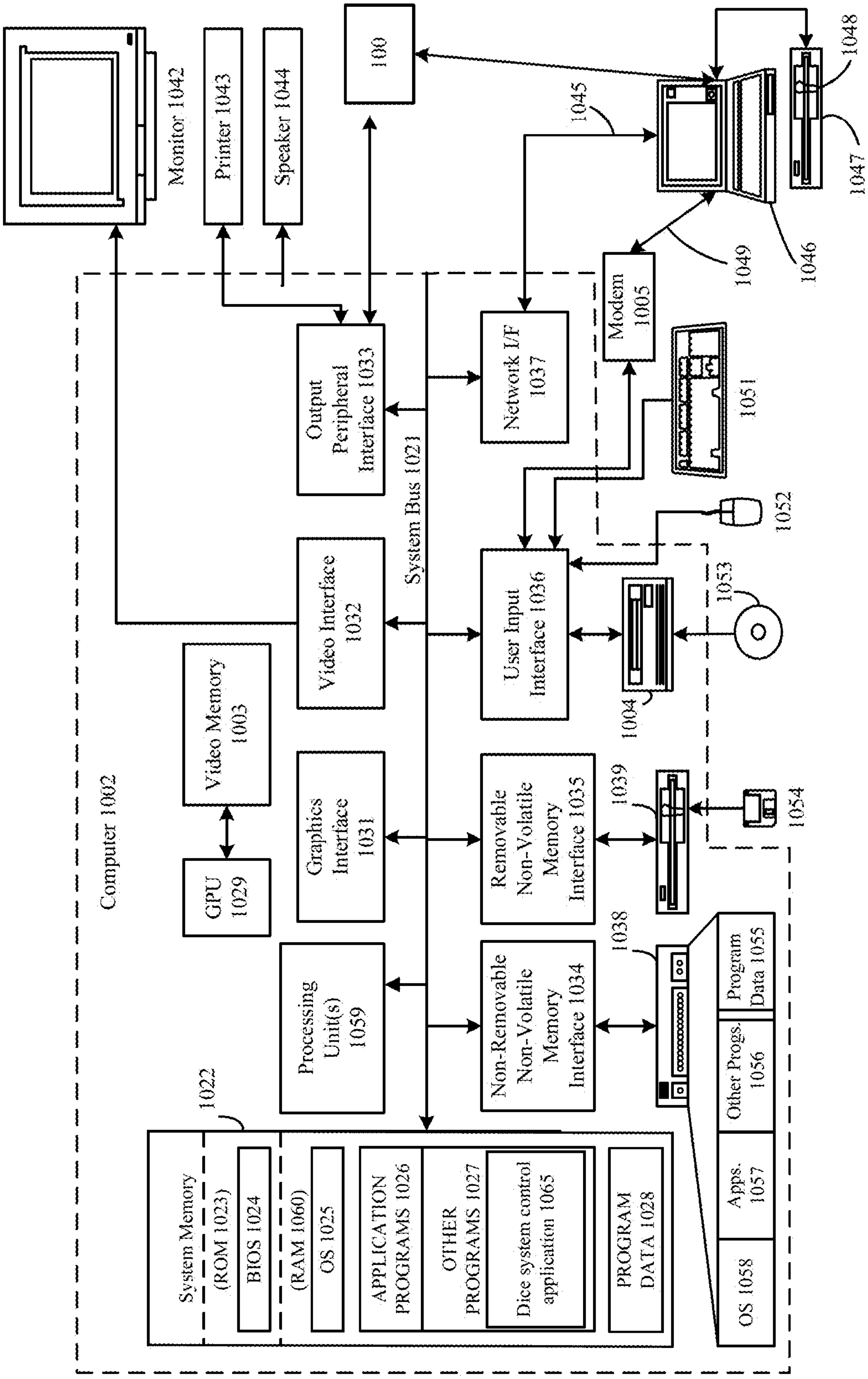
FIG. 10 depicts an example computing environment in which the described systems and processes may be implemented.

In some aspects dice system 100 and/or one or more of the above-described processes may be implemented using one or more computing devices or environments, as described below. FIG. 10 depicts an example general purpose computing environment, for example, that may embody one or more aspects of a local dice system controller associated with an individual (or three) instance of dice system and/or a centralized dice system that may communicate with dice system 100 over one or more wired or wireless communication networks. The computing system environment 1002 is only one example of a suitable computing environment and is not intended to suggest any limitation as to the scope of use or functionality of the presently disclosed subject matter. Neither should the computing environment 1002 be interpreted as having any dependency or requirement relating to any one or combination of components illustrated in the example operating environment 1002. In some embodiments the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 1002, which may include any of a mobile device or smart phone, tablet, laptop, desktop computer, or collection of networked devices, cloud computing resources, etc., typically includes a variety of computer-readable media. Computer-readable media can be any available media that can be accessed by computer 1002 and includes both volatile and nonvolatile media, removable and non-removable media. The system memory 1022 includes computer-readable storage media in the form of volatile and/or nonvolatile memory such as read only memory (ROM) 1023 and random access memory (RAM) 1060. A basic input/output system 1024 (BIOS), containing the basic routines that help to transfer information between elements within computer 1002, such as during start-up, is typically stored in ROM 1023. RAM 1060 typically contains data and/or program modules that are immediately accessible to and/or presently being operated on by processing unit 1059. By way of example, and not limitation, FIG. 10 illustrates operating system 1025, application programs 1026, other program modules 1027 including a dice system control application 1065, and program data 1028.

The computer 1002 may also include other removable/non-removable, volatile/nonvolatile computer storage media. By way of example only, FIG. 10 illustrates a hard disk drive 1038 that reads from or writes to non-removable, nonvolatile magnetic media, a magnetic disk drive 1039 that reads from or writes to a removable, nonvolatile magnetic disk 1054, and an optical disk drive 1004 that reads from or writes to a removable, nonvolatile optical disk 1053 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 1038 is typically connected to the system bus 1021 through a non-removable memory interface such as interface 1034, and magnetic disk drive 1039 and optical disk drive 1004 are typically connected to the system bus 1021 by a removable memory interface, such as interface 1035 or 1036.

The drives and their associated computer storage media discussed above and illustrated in FIG. 10, provide storage of computer-readable instructions, data structures, program modules and other data for the computer 1002. In FIG. 10, for example, hard disk drive 1038 is illustrated as storing operating system 1058, application programs 1057, other program modules 1056, and program data 1055. Note that these components can either be the same as or different from operating system 1025, application programs 1026, other program modules 1027, and program data 1028. Operating system 1058, application programs 1057, other program modules 1056, and program data 1055 are given different numbers here to illustrate that, at a minimum, they are different copies. A user may enter commands and information into the computer 1002 through input devices such as a keyboard 1051 and pointing device 1052, commonly referred to as a mouse, trackball or touch pad. Other input devices (not shown) may include a microphone, joystick, game pad, satellite dish, scanner, retinal scanner, or the like. These and other input devices are often connected to the processing unit 1059 through a user input interface 1036 that is coupled to the system bus 1021 but may be connected by other interface and bus structures, such as a parallel port, game port or a universal serial bus (USB). A monitor 1042 or other type of display device is also connected to the system bus 1021 via an interface, such as a video interface 1032. In addition to the monitor, computers may also include other peripheral output devices such as speakers 1044 and printer 1043, which may be connected through an output peripheral interface 1033.

The computer 1002 may operate in a networked environment using logical connections to one or more remote computers, such as a remote computer 1046. The remote computer 1046 may be a personal computer, a server, a router, a network PC, a peer device or other common network node, and typically includes many or all of the elements described above relative to the computer 1002, although only a memory storage device 1047 has been illustrated in FIG. 10. The logical connections depicted in FIG. 10 include a local arca network (LAN) 1045 and a wide area network (WAN) 1049 but may also include other networks. Such networking environments are commonplace in offices, enterprise-wide computer networks, intranets, the Internet, and cloud computing resources.

When used in a LAN networking environment, the computer 1002 is connected to the LAN 1045 through a network interface or adapter 1037. When used in a WAN networking environment, the computer 1002 typically includes a modem 1005 or other means for establishing communications over the WAN 1049, such as the Internet. The modem 1005, which may be internal or external, may be connected to the system bus 1021 via the user input interface 1036, or other appropriate mechanism. In a networked environment, program modules depicted relative to the computer 1002, or portions thereof, may be stored in the remote memory storage device. By way of example, and not limitation, FIG. 10 illustrates remote application programs 1048 as residing on memory device 1047. It will be appreciated that the network connections shown are example and other means of establishing a communications link between the computers may be used.

In some aspects, other programs 1027 may include a dice system control application 1065 that includes the functionality as described above. In some cases, dice system control application 1065, may execute some or all operations of process 800. In some aspects, computing device 1002 may also communicate with one or more dice systems 100.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage. The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. For purposes of this specification and the claims, the phrase "computer-readable storage medium" and variations thereof, does not include waves, signals, and/or other transitory and/or intangible communication media. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

In an embodiment, a method for revealing one or more dice results, the method comprising: vertically driving a movable platform for each of N separate dice systems to vertically throw at least one dice in an enclosed space for each corresponding dice system among the N dice systems; when the at least one dice has settled within the enclosed space, detecting upward facing pips on each of the settled dice to indicate a dice result for each corresponding dice system; receiving a selection of X dice systems among the N dice systems; visually indicating the selection of the X dice systems; raising a mechanical shutter for each of the X dice systems to reveal the dice result for each corresponding dice system among the X dice systems.

In the embodiment, wherein the raising the mechanical shutter includes winding up two or more flexible supports connected at a first end to a lower portion of each of the mechanical shutters and connected at a second end opposite the first end to a drive motor.

In the embodiment, wherein the two or more flexible supports are belts. In the embodiment, wherein the visually indicating includes indicating the X selection items through a graphical user interface.

In the embodiment, wherein the user interface includes Y buttons and indicating includes changing a display aspect of X selected buttons.

In the embodiment, wherein the visually indicating includes activating one or more illumination sources associated with X dice systems.

In the embodiment, further comprising visually indicating which of Z dice systems among the N dice systems that have not been selected.

In the embodiment, wherein the visually indicating which of the Z dice systems among the N dice systems that have not been selected comprises turning off one or more illumination sources associated with the Z dice systems.

In the embodiment, wherein visually indicating which of the Z dice systems among the N dice systems that have not been selected comprises making the Z dice systems not visible to a player of the dice gaming system.

In the embodiment, wherein making the Z dice systems not visible includes completely removing the Z dice systems from being visible.

In the embodiment, wherein completely removing the Z dice systems includes removing the Z dice systems with a mechanical device below a platform so the Z dice systems are not visible.

In the embodiment, wherein the mechanical device is one or more of a mechanical, electro-mechanical, or magnetic elevator.

In the embodiment, wherein the receiving the selection of the X dice systems includes receiving the selection of X dice systems from a graphic user interface displayed via a display device.

In the embodiment, wherein the user interface comprises at least one physical selection button or switch.

In the embodiment, wherein the receiving the selection of the X dice systems includes receiving the selection from a processor associated with the N dice systems if the selection of the X dice systems is not made by a player within a predetermined time period.

In the embodiment, wherein the selection from the processor is randomly generated.

In the embodiment, wherein the dice system is physically operated in a location separate from a player accessing the dice system remotely with a computer.

Conditional language used herein, such as, among others, “can,” “could,” “might,” “may,” “e.g.” and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms “comprising,” “including,” “having” and the like are synonymous and are used inclusively, in an open-ended fashion, and do not exclude additional elements, features, acts, operations and so forth. Also, the term “or” is used in its inclusive sense (and not in its exclusive sense) so that when used, for example, to connect a list of elements, the term “or” means one, some or all of the elements in the list.

While certain example embodiments have been described, these embodiments have been presented by way of example only and are not intended to limit the scope of the disclosure. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of certain of the disclosure.

What is claimed:

1. A method for revealing one or more dice results, the method comprising:

vertically driving a movable platform for each of N separate dice systems to vertically throw at least one dice in an enclosed space for each corresponding dice system among the N dice systems;

when the at least one dice has settled within the enclosed space, detecting upward facing pips on each of the settled dice to indicate a dice result for each corresponding dice system;

receiving a selection of X dice systems among the N dice systems;

visually indicating the selection of the X dice systems; and raising a mechanical shutter for each of the X dice systems to reveal the dice result for each corresponding dice system among the X dice systems, wherein raising the mechanical shutter includes winding up two or more flexible supports connected to the shutter and to a drive motor.

2. The method of claim 1, wherein the two or more flexible supports are connected at a first end to a lower portion of each of the mechanical shutters and connected at a second end opposite the first end to drive motor.

3. The method of claim 2, wherein the two or more supports are belts.

4. The method of claim 1, wherein the visually indicating includes indicating the X selection items through a graphical user interface.

5. The method of claim 4, wherein the user interface includes Y buttons and indicating includes changing a display aspect of X selected buttons.

6. The method of claim 1, wherein the visually indicating includes activating one or more illumination sources associated with X dice systems.

7. The method of claim 1, further comprising visually indicating which of Z dice systems among the N dice systems that have not been selected.

8. The method of claim 7, wherein the visually indicating which of the Z dice systems among the N dice systems that have not been selected comprises turning off one or more illumination sources associated with the Z dice systems.

9. The method of claim 8, wherein visually indicating which of the Z dice systems among the N dice systems that have not been selected comprises making the Z dice systems not visible to a player of the dice gaming system.

10. The method of claim 9, wherein making the Z dice systems not visible includes completely removing the Z dice systems from being visible.

11. The method of claim 10, wherein completely removing the Z dice systems includes removing the Z dice systems with a mechanical device below a platform so the Z dice systems are not visible.

12. The method of claim 10, wherein the mechanical device is one or more of a mechanical, electro-mechanical, or magnetic elevator.

13. The method of claim 1, wherein the receiving the selection of the X dice systems includes receiving the selection of X dice systems from a graphic user interface displayed via a display device.

14. The method of claim 13, wherein the user interface comprises at least one physical selection button or switch.

15. The method of claim 1, wherein the receiving the selection of the X dice systems includes receiving the selection from a processor associated with the N dice systems if the selection of the X dice systems is not made by a player within a predetermined time period.

16. The method of claim 15, wherein the selection from the processor is randomly generated.

17. The method of claim 1, wherein the dice system is physically operated in a location separate from a player accessing the dice system remotely with a computer.

18. The method of claim 1, wherein the mechanical shutter is positioned within the enclosed canister.

19. A method for revealing one or more dice results, the method comprising:

vertically driving a movable platform for each of N separate dice systems to vertically throw at least one dice in an enclosed space for each corresponding dice system among the N dice systems;

when the at least one dice has settled within the enclosed space, detecting upward facing pips on each of the settled dice to indicate a dice result for each corresponding dice system;

receiving a selection of X dice systems among the N dice systems;

visually indicating the selection of the X dice systems; and raising a mechanical shutter for each of the X dice systems to reveal the dice result for each corresponding dice system among the X dice systems, wherein the raising the mechanical shutter includes winding up two or more flexible supports connected at a first end to a lower portion of each of the mechanical shutters and connected at a second end opposite the first end to a drive motor.

* * * * *